(12) United States Patent
Yamazaki et al.

(10) Patent No.: US 8,894,735 B2
(45) Date of Patent: Nov. 25, 2014

(54) INTAKE DEVICE FOR ENGINE

(71) Applicant: Yamabiko Corporation, Tokyo (JP)

(72) Inventors: Takahiro Yamazaki, Tokyo (JP); Ken Shirai, Tokyo (JP); Hisato Osawa, Tokyo (JP); Yuji Numakunai, Iwate (JP)

(73) Assignee: Yamabiko Corporation, Tokyo (JP)

( * ) Notice: Subject to any disclaimer, the term of this patent is extended or adjusted under 35 U.S.C. 154(b) by 126 days.

(21) Appl. No.: 13/650,615

(22) Filed: Oct. 12, 2012

(65) Prior Publication Data
US 2013/0091816 A1 Apr. 18, 2013

(30) Foreign Application Priority Data
Oct. 13, 2011 (JP) ................................. 2011-225850

(51) Int. Cl.
| | | |
|---|---|---|
| *F02M 7/12* | (2006.01) | |
| *F02M 29/04* | (2006.01) | |
| *F02M 35/10* | (2006.01) | |
| *F02M 33/04* | (2006.01) | |
| *F02M 17/34* | (2006.01) | |
| *F02M 1/02* | (2006.01) | |

(52) U.S. Cl.
CPC ......... *F02M 35/10196* (2013.01); *F02M 29/04* (2013.01); *F02M 35/1019* (2013.01); *F02M 33/04* (2013.01); *F02M 17/34* (2013.01); *F02M 35/1017* (2013.01); *F02M 1/02* (2013.01); *Y02T 10/126* (2013.01); *Y10S 55/28* (2013.01)
USPC ................. 55/385.3; 55/DIG. 28; 126/198 E; 126/403; 267/42; 267/DIG. 52

(58) Field of Classification Search
USPC ................. 55/385.3, 325, 418, 495, DIG. 28; 123/73 PP, 73 A, 198 E, 403; 261/23.3, 261/23.2, 45, 54, 63, DIG. 1
See application file for complete search history.

(56) References Cited

U.S. PATENT DOCUMENTS

| | | |
|---|---|---|
| 6,889,637 B2 | 5/2005 | Rosskamp |
| 6,962,132 B2 | 11/2005 | Hoche et al. |

(Continued)

FOREIGN PATENT DOCUMENTS

| | | |
|---|---|---|
| DE | 10160539 A1 | 6/2003 |
| DE | 10341230 A1 | 3/2005 |
| DE | 102006047451 A1 | 4/2008 |

(Continued)

OTHER PUBLICATIONS

European Search Report for European Patent Application No. 12188335.9, Jan. 2013.

*Primary Examiner* — Duane Smith
*Assistant Examiner* — Minh-Chau Pham
(74) *Attorney, Agent, or Firm* — Baker & Hostetler LLP

(57) ABSTRACT

The intake device for an engine includes a carburetor section and an air cleaner section. The carburetor section includes a body having an intake passage which has an opening communicating with the air cleaner section and a choke valve being a butterfly valve having a plate-like valve body. The air cleaner section includes an air filter, an air-flow chamber provided between the air filter and the intake passage, and a reverse-flow restriction surface provided within the air-flow chamber. The air cleaner section further includes a plate-like partition extending from a location near an air-cleaner side periphery of the valve body of the choke valve in the full-open position to a location near the reverse-flow restriction surface so as to continue the periphery.

5 Claims, 4 Drawing Sheets

(56) References Cited

U.S. PATENT DOCUMENTS

| | | | |
|---|---|---|---|
| 7,806,953 B2 | 10/2010 | Schlauch | |
| 7,922,154 B2 * | 4/2011 | Soderquist | 261/23.3 |
| 8,394,165 B2 * | 3/2013 | Haussner et al. | 55/495 |
| 2003/0106508 A1 * | 6/2003 | Rosskamp | 123/73 PP |
| 2005/0051118 A1 * | 3/2005 | Hoche et al. | 123/73 A |
| 2008/0083199 A1 * | 4/2008 | Schlauch | 55/325 |
| 2008/0120951 A1 * | 5/2008 | Sato et al. | 55/418 |
| 2012/0160212 A1 * | 6/2012 | Maki et al. | 123/403 |

FOREIGN PATENT DOCUMENTS

| | | |
|---|---|---|
| EP | 1847701 B1 | 5/2011 |
| JP | 59-76757 A | 5/1984 |
| JP | 62-143062 A | 9/1987 |
| JP | 62-171655 U | 10/1987 |
| JP | 2000-345930 A1 | 12/2000 |

* cited by examiner

INTAKE DEVICE FOR ENGINE

CROSS-REFERENCE TO RELATED APPLICATION

This application claims priority to foreign Japan patent application No. JP 2011-225850, filed on Oct. 13, 2011, the disclosure of which is incorporated by reference in its entirety.

TECHNICAL FIELD

The present invention relates to an intake device for an engine, particularly, an intake device for an engine with a reverse-flow restriction device.

BACKGROUND ART

Intake air of a gasoline engine flows through a filter of an air cleaner and then flows from an inlet of a carburetor into an intake passage. In the carburetor, a mixed air of atomized gasoline and the intake air is formed and flows into an engine body. Due to a change in a pressure in the engine body and the like, a phenomenon where the mixed air, including lubrication oil, flows through the intake passage in the reverse direction may occur. This phenomenon is called a "reverse flow". In a two-stroke gasoline engine, when a pressure in a crankcase becomes high from moving a piston from top dead center to bottom dead center, most of the mixed air in the crankcase is supplied through a scavenging passage into a cylinder chamber, while a part of the mixed air may flow through the intake passage in the reverse direction together with the lubrication oil.

When the mixed air flowing through the intake passage in the reverse direction with the lubrication oil reaches the filter, the lubrication oil and the gasoline adhere to the filter. The gasoline adhering to the filter is evaporated and supplied again to the engine body together with intake air, while the lubrication oil is left on the filter, causing the filter to clog. Thus, as the operation period of the engine becomes long, clogging of the filter due to the lubrication oil may reduce the power output of the engine. Specifically, clogging of the filter increases flow resistance through the filter, reducing the amount of air so that a boost pressure of a fuel nozzle of the carburetor increases and thus the flow rate of the fuel increases. As a result, combustion in the engine is performed in a state of an excess fuel concentration such that the output of the engine is reduced. An operator has to replace the filter when the output of the engine is reduced due to the clogging of the filter causing an output performance to become worse.

In order to prevent the filter from being clogged by the lubrication oil, a technology of providing a reverse-flow restriction plate at the inlet of the carburetor has been known (for example, please refer to Patent Publications 1 and 2). Just after air-fuel mixture flowing through the intake passage in the reverse direction together with lubrication oil has passed through the inlet of the carburetor, it hits against the reverse-flow restriction plate and thus the amount of lubrication oil reaching the filter is reduced. A part of the lubrication oil adhering to the reverse-flow restriction plate is returned to the engine body together with intake air.

PRIOR ART PUBLICATION

Patent Publication 1. Japanese Patent Laid-open Publication No. 2000-345930

Patent Publication 2: Japanese Utility Model Laid-open Publication No. (S) 62-171655

SUMMARY OF THE INVENTION

Problem to be Solved by the Invention

In the intake device described in the above-mentioned Patent Publications 1 and 2, the fuel and the lubrication oil having hit against the reverse-flow restriction plate adhere onto a choke valve or become droplets so as to gradually accumulate onto a reservoir plate (Patent Publication 1) or a choke valve (Patent Publication 2) disposed below the reverse-flow restriction plate. The fuel and lubrication oil having become droplets to accumulate onto the reservoir plate and so on are normally carried back through the intake passage to the engine body together with the flow of intake air. However, when the lubrication oil droplets accumulated on the reservoir plate are carried back to the engine body, a certain amount of the accumulated lubrication oil tends to be carried back at one time. Then, the rotation speed of the engine becomes unstable, which is not preferable. Further, when an operator changes the position of a device with an engine (such as a chainsaw, a blower and another hand-held power working machine), the accumulated lubrication oil may flow into the engine body at one time so that the engine stalls (stop of the engine).

Further, for example, when there is a reservoir plate for accumulating the fuel and lubrication oil having hit against the reverse-flow restriction plate, the reservoir plate obstructs the intake air so that the output of the engine may decrease.

It is an object of the present invention that an intake device for an engine which can reduce adherence of lubrication oil onto a filter due to a reverse flow without restricting intake air is provided.

Means for Solving the Problem

In order to achieve the above-mentioned purpose, an intake device for an engine according to the present invention comprises a carburetor section and an air cleaner section connected upstream of the carburetor section, wherein the carburetor section includes a body having an intake passage which has an opening communicating with the air cleaner section, and a choke valve located within the intake passage near the opening, the choke valve being a butterfly valve having a plate-like valve body, wherein the air cleaner section includes an air filter, an air-flow chamber provided between the air filter and the intake passage, and a reverse-flow restriction surface provided within the air-flow chamber, the reverse-flow restriction surface being spaced from the opening of the intake passage and facing the entire opening to form a space between the opening and the reverse-flow restriction surface, and wherein the air cleaner section further includes a plate-like partition extending from a location near an air-cleaner side periphery of the valve body of the choke valve in its full-open position to at least a location near the reverse-flow restriction surface so as to continue the periphery.

In this intake device, during an intake operation, intake air entering through the air filter into the air-flow chamber is guided by the plate-like partition from the space between the opening of the intake passage of the carburetor section and the reverse-flow restriction surface facing the entire opening, flows into the intake passage, passes through the choke valve, and is supplied to the engine. While reverse flow occurs, an air-fuel mixture which includes lubrication oil and flows in the reverse direction through the intake passage and is guided by the choke valve in the full-open position and the plate-like partition so as to hit against the reverse-flow restriction surface. A part of the lubrication oil and fuel included in the air-fuel mixture adheres onto the reverse-flow restriction surface. The adhered lubrication oil and fuel are carried back to the intake passage together with intake air during an intake operation and are supplied to the engine again.

Since the plate-like partition of the intake device extends from a location near an air-cleaner side periphery of the valve body of the choke valve in the full-open position so as to continue the periphery, during an intake operation, the partition merely guides the intake air. Thus, the partition does not obstruct the intake air. Further, since there is no element for accumulating lubrication oil and fuel, such as a reservoir plate, described in the Patent Publications 1 and 2, the opening area for intake air is not reduced by such an element. Thus, in the above-mentioned intake device, the flow of intake air during an intake operation is not obstructed.

Further, when a reverse flow occurs, since air-fuel mixtures flowing through both sides of the plate-like valve body of the choke valve in the full-open position are separated from each other and guided by the platelike partition extending so as to continue the periphery of the valve body of the choke valve, both of the air-fuel mixtures are protected from hitting against each other and causing a turbulent flow. Thus, after the air-fuel mixtures hit the reverse-flow restriction surface, they tend to turn in their respective two partial spaces divided by the partition in the space between the reverse-flow restriction surface and the opening of the intake passage so as to naturally return to the intake passage so that the air-fuel mixtures are restricted from diffusing out of the space. Then, an amount of lubrication oil passing from the above-stated space through the air-flow chamber and reaching the air filter is reduced. As a result, adherence of the lubrication oil onto the filter due to the reverse flow can be reduced.

In the above-mentioned intake device, preferably, the partition has a plate-like flat shape.

Further, in the above-mentioned intake device, the partition may have a cutout near the reverse-flow restriction surface or have a width substantially the same as that of the valve body from a location near the periphery of the valve body of the choke valve to a location near the reverse-flow restriction surface.

Further, in the above-mentioned intake device, preferably, the air cleaner section further includes a bridge which extends from at least one surface of the plate-like partition and is coupled to the body of the carburetor section near the opening of the intake passage.

Further, in the above-mentioned intake device, preferably, the carburetor section further includes a throttle valve located downstream of the choke valve and a second plate-like partition provided in the intake passage and, when both of the choke valve and the throttle valve are in their full-open positions, extending from a location near a choke-valve side periphery of the valve body of the throttle valve to a location near a throttle-valve side periphery of the valve body of the choke valve so as to continue the peripheries of the choke valve and the throttle valve. More preferably, the carburetor section further has a second bridge which extends from at least one surface of the second plate-like partition and is coupled to the body of the carburetor section on an inner surface of the intake passage.

Effect of the Invention

The intake device for an engine according to the present invention can reduce adherence of lubrication oil onto a filter due to reverse flow without restricting intake air.

DESCRIPTION OF EMBODIMENTS

Figure 1:
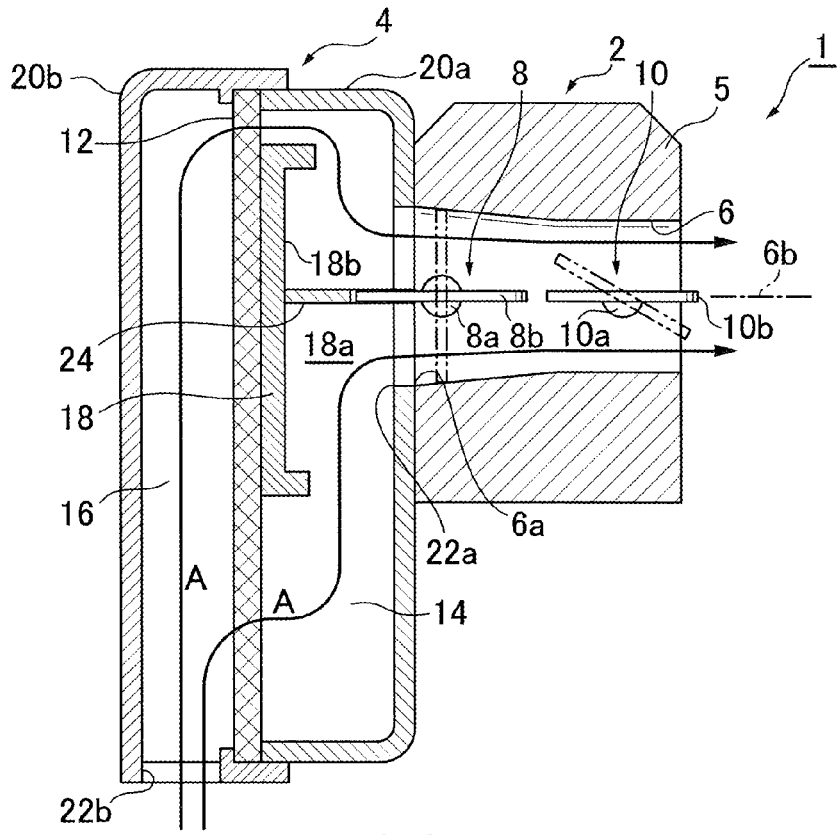
FIG. 1 is a side cross-sectional view of an intake device according to the present invention.
Figure 2:
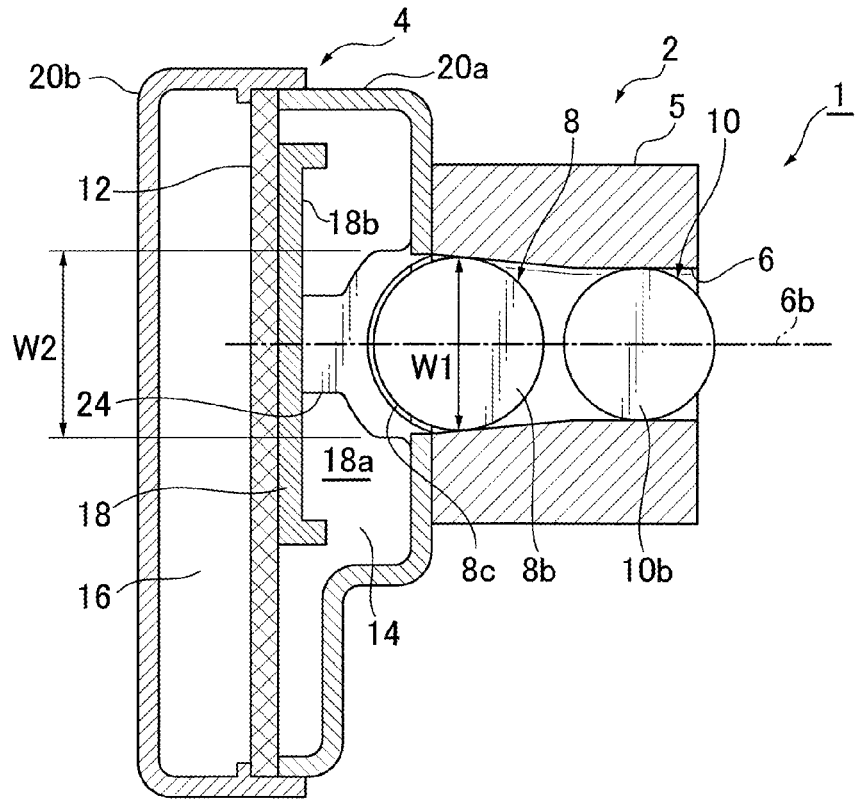
FIG. 2 is a top cross-sectional view of the intake device shown in FIG. 1.

Referring to Figures, an embodiment of an intake device according to the present invention will be explained. FIG. 1 is a side cross-sectional view of an intake device according to the present invention. FIG. 2 is a top cross-sectional view of the intake device shown in FIG. 1.

As shown in FIGS. 1 and 2, an intake device 1 according to the present invention has a carburetor section 2 and an air cleaner section 4 connected upstream of the carburetor section 2. An engine body (not shown) is connected downstream of the carburetor section 2. Air flow during an intake operation, namely, air flow from the upstream side to the downstream side, is shown as an arrow A.

The carburetor section 2 includes a body 5 having an intake passage 6, which has an opening 6a communicating with the air cleaner section 4 and a straight-line axis 6b. Further, the carburetor section 2 includes a choke valve 8 located within the intake passage 6 near the opening 6a and a throttle valve 10 located downstream of the choke valve 8. A nozzle (not shown) for atomizing fuel is located below the choke valve 8.

The choke valve 8 is a butterfly valve and has a shaft 8a extending across the intake passage 6 and a plate-like valve body 8b pivotable around the shaft 8a. The throttle valve 10 is also a butterfly valve like the choke valve 8, and has a shaft 10a extending across the intake passage 6 and a plate-like valve body 10b pivotable around the shaft 10a. The cross section of the intake passage 6 is preferably circular, but it may be quadrangular or another shape. The shapes of the valve bodies 8b, 10b are preferably defined so as to conform to the cross section of the intake passage 6, and they may be circular, quadrangular or other shapes. In FIG. 1, the choke valve 8 and the throttle valve 10 in their full-open positions are shown by solid lines, while the choke valve 8 in the closed position and the throttle valve 10 in the half-open position during an idle operation are shown by two-dot chain lines.

Further, attachment angles of the shaft 8a of the choke valve 8 and the shaft 10a of the throttle valve 10 with respect to the intake passage 6 are arbitrary. Namely, the shaft 8a of the choke valve 8 and the shaft 10a of the throttle valve 10 may be disposed horizontally, vertically, or at an angle between the horizontal and vertical directions. The shaft 8a of the choke valve 8 and the shaft 10a of the throttle valve 10 are preferably parallel to each other so that the valve body 8*b* of the choke valve 8 in the full-open position and the valve body 10*b* of the throttle valve 10 in the full-open position are located within an identical plane.

Further, the valve body 8*b* of the choke valve 8 in the full-open position is located so as to protrude from the intake passage 6 toward the upstream side, namely, the air-cleaner side. The valve body 8*b* of the choke valve 8 has a width W1 in a direction perpendicular to the axis 6*b*. When the valve body 8*b* is circular, the width W1 is equal to a diameter of the valve body 8*b*.

The air cleaner section 4 includes an air filter 12, an air-flow chamber 14 provided between the air filter 12 and the intake passage 6, an inlet chamber 16 provided upstream of the air filter 12, and a reverse-flow restriction plate 18 provided within the air-flow chamber 14.

The air filter 12 has a structure that allows air to pass through, while oil is not allowed to pass through it. For example, the air filter 12 may have a plate-like shape and be made of felt or nylon.

The air-flow chamber 14 and the inlet chamber 16 are defined by a dividable box body 20*a*, 20*b* attached to the carburetor section 2, and the air filter 12. Specifically, the box body 20*a*, 20*b* includes a downstream half box 20*a* attached to the carburetor section 2 and an upstream half box 20*b* attached to the downstream half box 20*a* via the air filter 12. The air-flow chamber 14 is formed between the downstream half box 20*a* and the air filter 12, and the downstream half box 20*a* has an aperture 22*a* communicating with the opening 6*a* of the intake passage 6. Further, the inlet chamber 16 is formed between the upstream half box 20*b* and the air filter 12, and the upstream half box 20*b* has an aperture 22*b* communicating with the external region.

The reverse-flow restriction plate 18 has a reverse-flow restriction surface 18*b* which is spaced from the opening 6*a* of the intake passage 6 and faces the entire opening 6*a* so as to form a space 18*a* between the opening 6*a* and the reverse-flow restriction surface 18*b*. Preferably, the reverse-flow restriction plate 18 is detachably attached and positioned to the downstream half box 20*a* via a connection (not shown). A passage communicating with the inlet chamber 16 and the air-flow chamber 18 is provided at any location around the reverse-flow restriction plate 18. In the present embodiment, such passages are provided on both sides of the valve body 8*b* of the choke valve 8 in the full-open position.

The reverse-flow restriction surface 18*b* is preferably a flat surface. When the reverse-flow restriction surface 18*b* is a flat surface, it is preferably located substantially perpendicular to the axis 6*b* of the intake passage 6.

The air cleaner section 4 further includes a plate-like partition 24 extending from a location near an air-cleaner side (or upstream) periphery 8*c* of the valve body 8*b* of the choke valve 8 in the full-open position to at least a location near the reverse-flow restriction surface 18*b*. Preferably, the partition 24 is substantially located over an upstream half of the periphery 8*c* of the valve body 8*b*. A gap between the partition 24 and the valve body 8*b* is preferably equal to or smaller than 0.5 mm, more preferably, as small as possible, so that the partition 24 does not contact the valve body 8*b* and reverse flow passing over the valve body 8*b* is directed to the reverse-flow restriction surface 18*b*. The partition 24 and the reverse-flow restriction surface 18*b* may contact each other or form a gap therebetween. Further, the thickness of the partition 24 is preferably the same as that of the valve body 8*b*. In the present embodiment, the partition 24 is integrally formed with the downstream half box 20*a*.

Near the periphery 8*c* of the valve body 8*b* of the choke valve 8, the partition 24 preferably has a width W2 which is equal to or greater than the width W1 of the valve body 8*b*. Near the reverse-flow restriction surface 18*b*, the partition 24 may have a width which is substantially equal to or smaller than the width W1 of the valve body 8*b*, and may have a cutout or an aperture.

Figure 3:
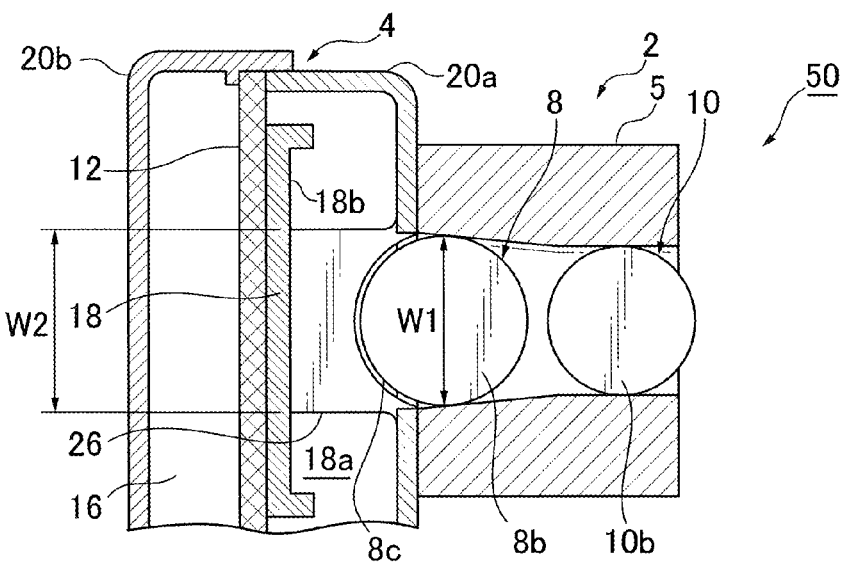
FIG. 3 shows an alternative partition.
Figure 4:
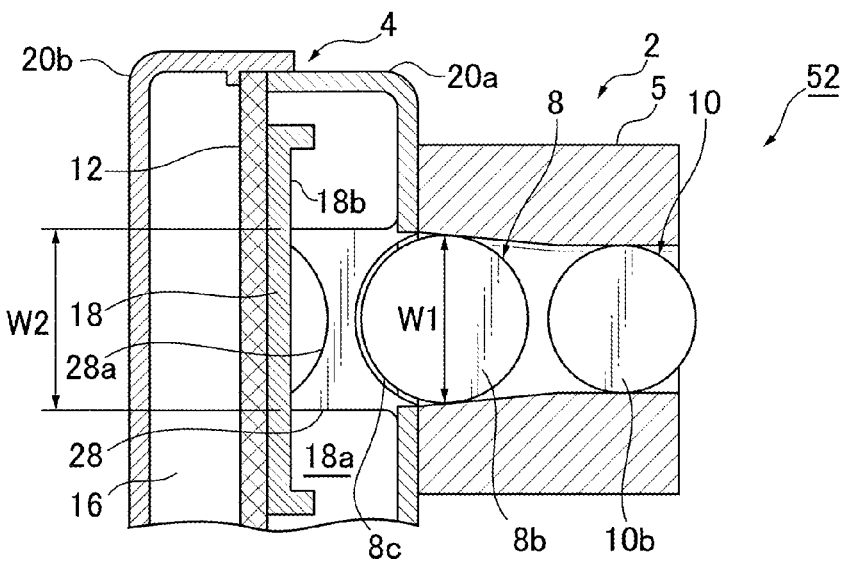
FIG. 4 shows an alternative partition.
Figure 5:
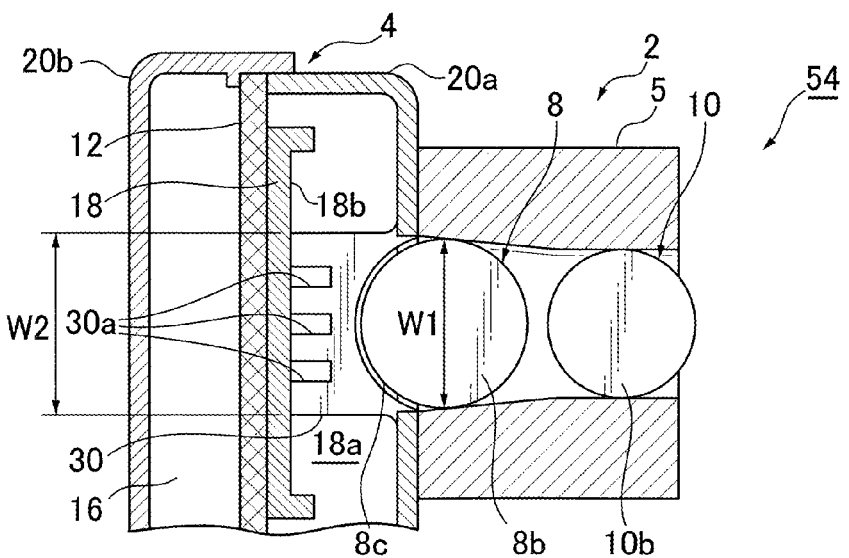
FIG. 5 shows an alternative partition.

Alternative examples of the partition 24 are shown in FIGS. 3-5. FIGS. 3-5 show respective alternative examples of the intake device 50, 52, 54 having the same structure of that in the embodiment shown in FIGS. 1 and 2 except for that shapes of the partitions shown in FIGS. 3-5 are different from that of the partition 24 of the embodiment shown in FIGS. 1 and 2.

A partition 26 of an intake device 50 shown in FIG. 3 substantially has the same width as that of the valve body 8*b* of the choke valve 8 from a location near the periphery 8*c* of the valve body 8*b* to a location near the reverse-flow restriction surface 18*b*.

A partition 28 of an intake device 52 shown in FIG. 4 substantially has the same width as that of the valve body 8*b* of the choke valve 8 from a location near the periphery 8*c* of the valve body 8*b* to a location near the reverse-flow restriction surface 18*b*, and has an arcuate cutout 28*a* near the reverse-flow restriction surface 18*b*.

A partition 30 of an intake device 54 shown in FIG. 5 substantially has the same width as that of the valve body 8*b* of the choke valve 8 from a location near the periphery S*c* of the valve body 8*b* to a location near the reverse-flow restriction surface 18*b*, and has three rectangular cutouts 30*a* near the reverse-flow restriction surface 18*b*.

Shapes of the plate-like partitions 24, 26, 28, 30 may restrict the generation of turbulent flow after a reverse flow of air-fuel mixture hits against the reverse-flow restriction plate 18. Namely, the shapes of the partitions 24, 26, 28 30 may ensure that turbulent flow is restricted from diffusing lubrication oil included in the air-fuel mixture to the air filter 12.

Next, an operation of the intake device according to the present invention will be explained.

When the engine starts, the choke valve 8 is in a substantially closed position, and the throttle valve 10 is opened a little so that the engine is operated. After the engine starts, the choke valve 8 is moved to the full-open position, while the throttle valve 10 is adjusted to an appropriately open position depending on an application.

During an intake operation, intake air entering through the aperture 22*b* of the inlet chamber 16 flows through the air filter 12 into the air-flow chamber 14, is guided by the plate-like partition 24 from a space 18*a* between the opening 6*a* of the intake passage 6 of the carburetor section 2 and the reverse-flow restriction surface 18*b*, and flows into the intake passage 6. After the intake air passes the choke valve 8, it is mixed with fuel, passes through the throttle valve 10, and is supplied to the engine.

While reverse flow occurs, the air-fuel mixture including lubrication oil and flowing in the reverse direction through the intake passage 6 is guided by the choke valve 8 in the full-open position and the plate-like partition 24 so as to hit against the reverse-flow restriction surface 18*b*. The lubrication oil and fuel included in the air-fuel mixture adhere onto the reverse-flow restriction surface 18*b*. The adhered lubrication oil and fuel are carried back to the intake passage 6 together with intake air during an intake operation so as to be supplied to the engine again.

In the above-mentioned intake device, since there is no element for accumulating lubrication oil, such as a receiving plate, described in the Patent Publications 1 and 2, there is no element which obstructs the passage for intake air flowing from the inlet chamber 16 through the air filter 12 into the air-flow chamber 14 and the space 18a between the opening 6a of the intake passage 6 and the reverse-flow restriction plate 18. This ensures a cross-sectional area for the passage which does not obstruct the flow of intake air.

Further, since the plate-like partition 24 extends from a location near the air-cleaner side periphery 8c of the choke valve 8 in the full-open position toward the reverse-flow restriction surface 18b so as to continue the periphery 8c, the flow of the air-fuel mixture when the reverse flow occurs is less disturbed than that in case where the partition 24 is not provided. Thus, in the space 18a, lubrication oil and gasoline which do not adhere onto the reverse-flow restriction surface 18b tend to turn in their respective two partial spaces divided by the partition 24 in such a manner as to naturally return to the intake passage 6 so that they pass through the intake passage 6 and are supplied to the engine again. Namely, the amount of lubrication oil diffusing out of the space 18a between the reverse-flow restriction surface 18b and the opening 6a is reduced so that the amount of lubrication oil reaching the air filter 12 is reduced. Thus, adherence of the lubrication oil onto the air filter 12 due to the reverse flow can be reduced.

Figure 6:
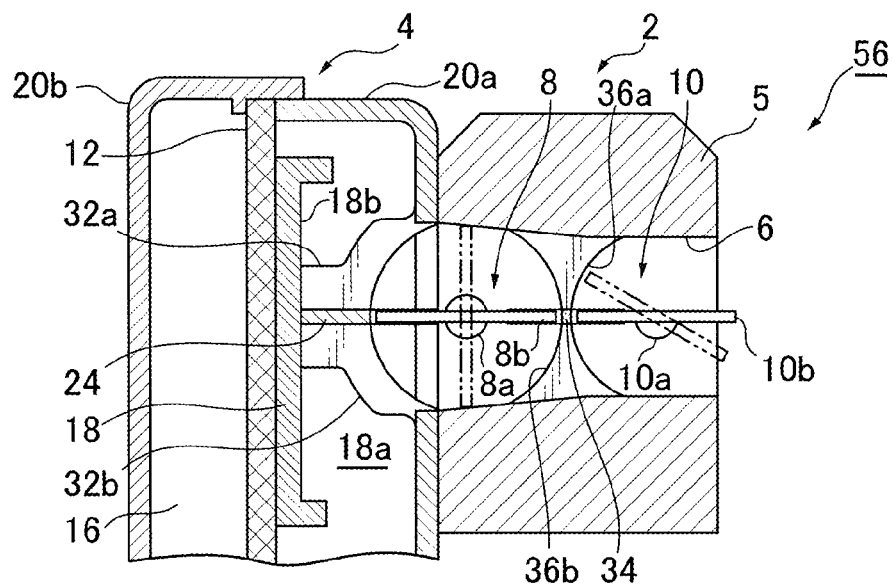
FIG. 6 is a side cross-sectional view of an alternative intake device according to the present invention.
Figure 7:
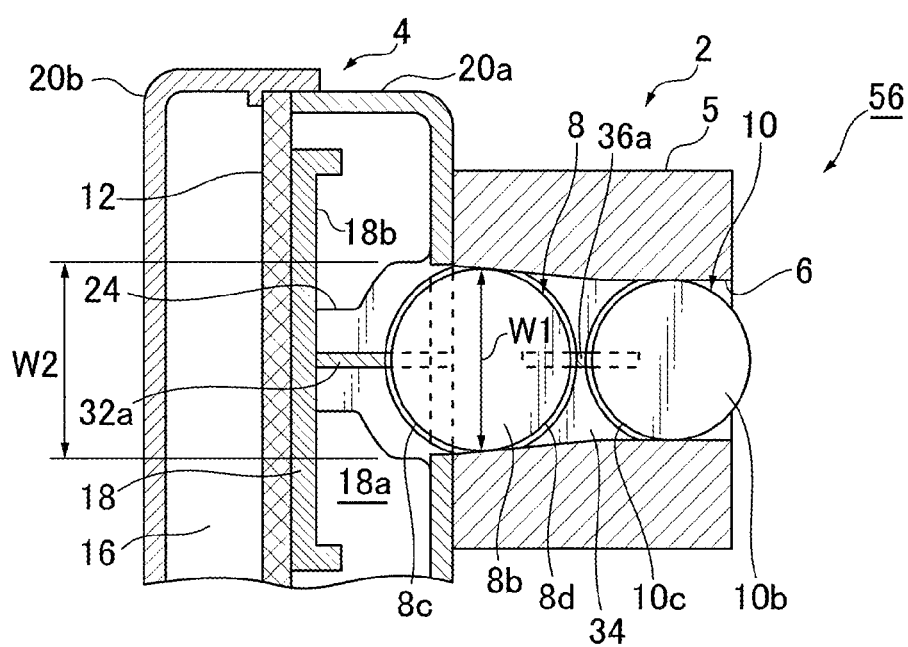
FIG. 7 is a top cross-sectional view of the intake device shown in FIG. 6.

Next, an alternative embodiment of the intake device according to the present invention will be explained. FIG. 6 is a side cross-sectional view of an alternative embodiment of the intake device according to the present invention. FIG. 7 is a top cross-sectional view of the intake device shown in FIG. 6. An intake device 56 shown in FIGS. 6 and 7 is the same as the intake device 1 shown in FIGS. 1 and 2 except for that the intake device 56 additionally has bridges 32a, 32b, a second partition 34, and second bridges 36a, 36b, which are explained later.

Preferably, the air cleaner section 4 further includes bridges 32a, 32b. The bridge 32a extends from one surface of the partition 24 and is configured to be coupled to the body 5 of the carburetor section 2 near the opening 6a of the intake passage 6. In the present embodiment, the bridge 32a is coupled to the body 5 via the downstream half box 20a near the opening 6a of the intake passage 6. Further, the bridge 32b extends from the other surface of the partition 24 and is configured to be coupled to the body 5 of the carburetor section 2 near the opening 6a of the intake passage 6. In the present embodiment, the bridge 32b is coupled to the body 5 via the downstream half box 20a near the opening 6a of the intake passage 6. The bridges 32a, 32b preferably have plate-like shapes and are provided parallel to the axis 6b so that they do not become resistances against the intake air.

The carburetor section 2 further includes a second plate-like partition 34 which is provided in the intake passage 6 and, when both of the choke valve 8 and the throttle valve 10 are in the full open positions, extends from a location near a choke-valve side periphery 10c of the valve body 10b of the throttle valve 10 to a location near a throttle-valve side periphery 8d of the valve body 8b of the choke valve 8 so as to continue the periphery 8d of the choke valve 8 and the periphery 10c of the throttle valve 10. Preferably, the second partition 34 is substantially located over a downstream half of the periphery 8d of the valve body 8b of the choke valve 8 and over an upstream half of the periphery 10c of the valve body 10b of the throttle valve 10. Gaps between the second partition 34 and the valve bodies 8b, 10b are preferably equal to or smaller than 0.5 mm, more preferably, as small as possible, so that the second partition 34 does not contact the valve bodies 8b, 10b and the reverse flow passing over the valve bodies 8b, 10b is directed to the reverse-flow restriction surface 18b. Further, the thickness of the second partition 34 is preferably the same as those of the valve bodies 8b, 10b. In the present embodiment, the second partition 34 is integrally formed with the body 5 of the carburetor section 2.

The carburetor section 2 further includes second bridges 36a, 36b. The second bridge 36a extends from one surface of the second plate-like partition 34 and is configured to be coupled to the body 5 of the carburetor section 2 on an inner surface of the intake passage 6. The second bridge 36b extends from the other surface of the second plate-like partition 34 and is configured to be coupled to the body 5 of the carburetor section 2 on the inner surface of the intake passage 6. The second bridges 36a, 36b preferably have plate-like shapes and are provided parallel to the axis 6b so that they are not resistances against the intake air.

In the intake device 56, since the second partition 34 is provided between the choke valve 8 and the throttle valve 10, the flow of the air-fuel mixture when the reverse flow occurs is less disturbed than that in case the second partition 34 is not provided. Thus, lubrication oil and gasoline, which hit against the reverse-flow restriction surface 18b and do not adhere onto the reverse-flow restriction surface 18b, turn in their respective two partial spaces divided by the partition 24 in a manner as to naturally return to the intake passage 6 so that they smoothly pass through the choke valve 8 and the throttle valve 10 and are supplied to the engine again. As a result, the amount of lubrication oil diffusing out of the space 18a between the reverse-flow restriction surface 18b and the opening 6a is further reduced so that the amount of lubrication oil reaching the air filter 12 is further reduced. Thus, adherence of the lubrication oil onto the air filter 12 due to the reverse flow can be further reduced.

Further, in the intake device 56, when a reverse flow occurs, after the air-fuel mixture including the lubrication oil hits against the reverse-flow restriction surface 18b, the lubrication oil adheres not only onto the reverse-flow restriction surface 18b but also onto the bridges 32a, 32b, 36a, 36b. This further restricts the lubrication oil from diffusing toward the air filter 12. The lubrication oil adhering onto the bridges 32a, 32b, 36a, 36b are carried back to the engine together with intake air during an intake operation.

Figure 8:
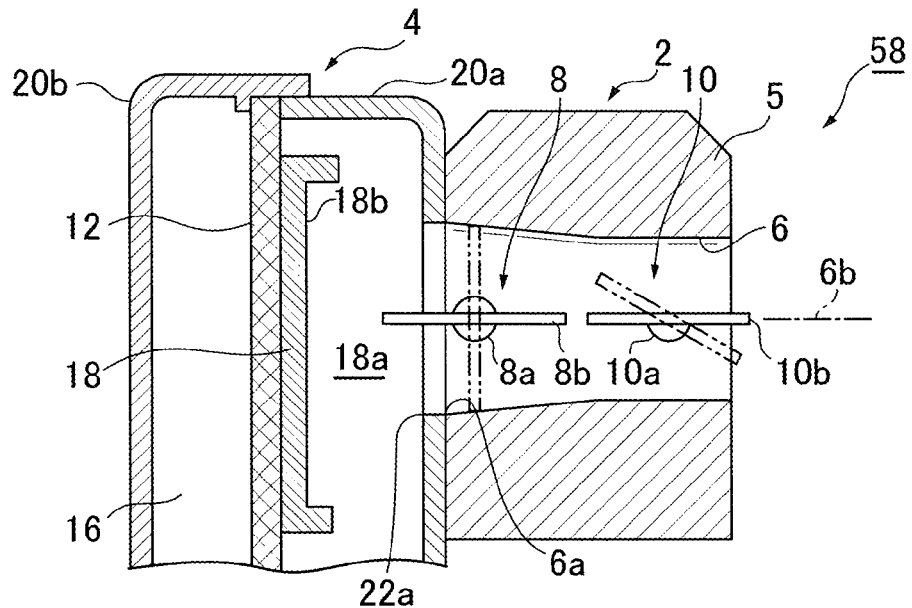
FIG. 8 is a side cross-sectional view of a prior art intake device.
Figure 9:
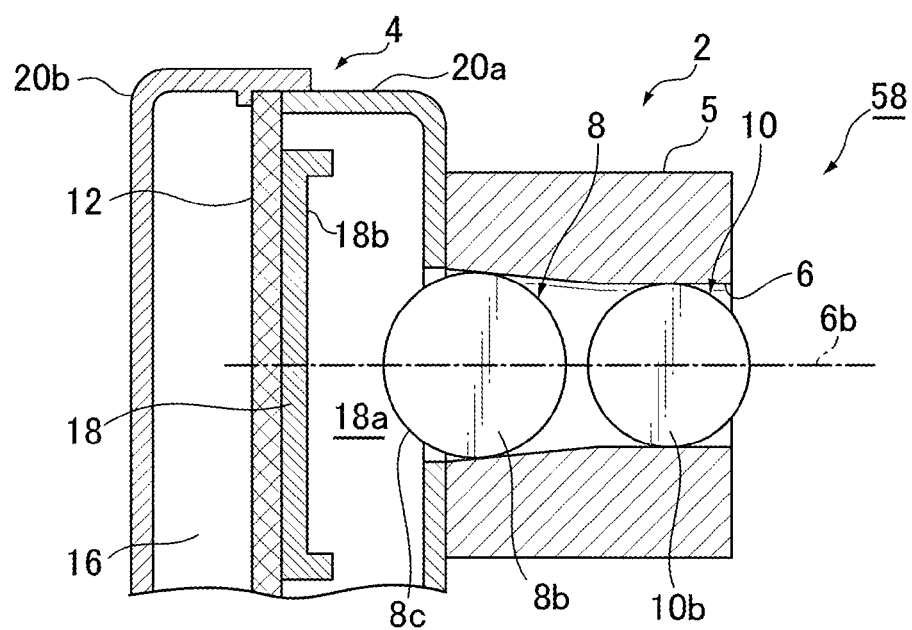
FIG. 9 is a top cross-sectional view of the intake device shown in FIG. 8.

Next, an experiment performed for comparing the embodiment of the intake device according to the present invention shown in FIGS. 1 and 2 with the prior art intake device shown in FIGS. 8 and 9 will be explained. FIG. 8 is a side cross-sectional view of the prior art intake device. FIG. 9 is a top cross-sectional view of the intake device shown in FIG. 8. The prior art intake device 58 has the same structure as that of the intake device according to the present invention except for that the prior art intake device 58 has no partition 24.

Continuous operation tests were performed from a state in which the air filter 12 was fresh so that it was not dirty with lubrication oil, with conditions (for example, timings) of relatively occurring reverse flow while the throttle valve was in the full-open position. When the air filter 12 was not dirty with lubrication oil, both of engines respectively having the intake device 1 according to the present invention and the prior art intake device 58 rotated at 15,000 rpm.

As the air filter 12 became dirty with the lubrication oil due to reverse flow, even if the throttle valve was in the full-open position, the rotation speeds of the engines decreased. The period until the rotation speed decreased to 14,500 rpm was 72 hours for the engine with the intake device 1 according to the present invention, while said period was 24 hours for the engine with the prior art intake device 58. Thus, it is confirmed that the intake device 1 according to the present invention provided with the partition 24 prevented much more dirtying of the air filter 12 due to the lubrication oil when reverse flow occurred than the prior art intake device 58, which is not provided with any partitions 24. In the intake device 1 according to the present invention, a period until an air filter 12 should be replaced with another one can be extended about three times as much as said period in the prior art intake device 58.

Although the embodiments of the present invention have been explained above, the present invention is not limited to the above-mentioned embodiments and can be modified in various ways within the scope of the claims so that such modifications apparently fall within the scope of the present invention.

In the above-stated embodiment, although the valve body 8b of the choke valve 8 in the full-open position protrudes from the intake passage 6, it may be modified so that it does not protrude. Further, the plate-like partitions 24, 26, 28, 30 may be of a shape that is not flat, for example, a half twisted shape, if it extends from a location near the periphery 8c of the valve body 8b so as to continue the periphery 8c. Further, in the above-stated embodiment, although the reverse-flow restriction surface 18b is flat, it may be curved.

The engine may be a gasoline engine or an air-fuel mixture pre-introduction type diesel engine. In case of the gasoline engine, it may be a two-stroke engine or a four-stroke engine. In case of the four-stroke engine, during an intake operation, since there is a pulsation due to an operation of an intake port or an intake valve of a cylinder, a reverse flow may occur, for example, during a high speed operation.

In the alternative intake device 56, the bridges 32a, 32b, the second partition 34 and the second bridges 36a, 36b are arbitrary elements so that one or more of them may be omitted.

What is claimed:

1. An intake device for an engine comprising:
   a carburetor section and an air cleaner section connected upstream of the carburetor section,
   wherein the carburetor section includes a body having an intake passage which has an opening communicating with the air cleaner section and a choke valve located within the intake passage near the opening, the choke valve being a butterfly valve having a plate-like valve body,
   wherein the air cleaner section includes an air filter, an air-flow chamber provided between the air filter and the intake passage, and a reverse-flow restriction surface provided within the air-flow chamber, the reverse-flow restriction surface being spaced from the opening of the intake passage and facing the entire opening to form a space between the opening and the reverse-flow restriction surface,
   wherein the air cleaner section further includes a plate-like partition having surfaces exposed to the air-flow chamber and extending from a location near an air-cleaner side periphery of the valve body of the choke valve in the full-open position to at least a location near the reverse-flow restriction surface so as to continue the periphery, and
   wherein the air cleaner section further includes a bridge which extends from at least one of the surfaces of the plate-like partition and is coupled to the body of the carburetor section near the opening of the intake passage.

2. The intake device according to claim 1, wherein the partition has a plate-like flat shape.

3. The intake device according to claim 1, wherein the partition has a width substantially the same as that of the valve body from a location near the periphery of the valve body of the choke valve to a location near the reverse-flow restriction surface.

4. The intake device according to claim 1, wherein the carburetor section further includes a throttle valve located downstream of the choke valve and a second plate-like partition provided in the intake passage, and wherein when both of the choke valve and the throttle valve are in their full-open positions, the second plate-like partition extends from a location near a choke-valve side periphery of a valve body of the throttle valve to a location near a throttle-valve side periphery of the valve body of the choke valve so as to continue the peripheries of the choke valve and the throttle valve.

5. The intake device according to claim 4, wherein the carburetor section further has a second bridge which extends from at least one surface of the second plate-like partition and is coupled to the body of the carburetor section on an inner surface of the intake passage.

* * * * *